United States Patent Office 3,054,694
Patented Sept. 18, 1962

3,054,694
METAL-CERAMIC LAMINATED COATING AND PROCESS FOR MAKING THE SAME
William L. Aves, Jr., Arlington, Tex., assignor, by mesne assignments, to the United States of America as represented by the Secretary of the Navy
No Drawing. Filed Oct. 23, 1959, Ser. No. 848,477
2 Claims. (Cl. 117—70)

The present invention relates to protective coatings. More particularly, it relates to a multi-layer coating designed to protect a material employed in an environment where it may be expected to encounter intense heat and/or the corrosive effects of high-velocity gases.

In the present era of hypersonic space flight, one problem most difficult of satisfactory solution is that of providing high-temperature protection to minimize both corrosion and erosion of the surfaces of the space vehicle during its re-entry into the atmosphere. Even with guided missiles of more restricted range, the conditions under which certain operations must be carried out are most severe. For example, conventional rockets used to augment a missile's engine during launching often produce a 5000° F. blast accomplished by high-velocity gases. Obviously a material which will withstand these conditions for the required period of time must possess very unusual properties. In addition to the use of high-temperature-resistant materials in the fabrication of such components as after-burner probes, rocket blast deflectors, rocket nozzles and thermocouple protection tubes, they are also indicated for rocket motor linings, nose cones, airfoil leading edges, heat-treating racks, furnace linings, and many types of bearings. In each of the above applications, it is desirable that the material utilized possess one or more of the properties of high-temperature resistance, erosion, wear and abrasion resistance, high dielectric strength, thermal shock resistance and resistance to attack by corrosive fluids and gases. Other factors, such as the material's ductility, its coefficient of thermal expansion and contraction, and its electrical conductivity, may or may not be important in any particular situation. However, the fatigue strength of the substance employed is almost without exception of major interest in determining its ability to perform the function assigned thereto.

It has been found that available materials of a thickness dictated by space, weight, shape and fabrication limitations do not possess adequate resistance to burn-out when intended, for example, to contain a rocket motor blast in the event of the motor's accidental ignition. For protection of equipment and personnel, this blast must not be permitted to impact vulnerable portions of the aircraft structure or even reach areas proximate thereto. In an attempt to devise a solution to the problem, a breech was constructed of .125 gauge 17–7 PH stainless steel, heat treated to 190,000 p.s.i. This barrier burned through in approximately .7 second even though protected with a .01 in. coating of alumina. Since the thrust time of a solid-propellant rocket motor is generally in the neighborhood of 2 seconds, the protection afforded by such a breech is clearly inadequate. Increasing the thickness of the alumina coating is not practicable, since this decreases the ability of the alumina particles to adhere to one another and thus increases the tendency of the substance to disintegrate. Use of thicker gauge steel is undesirable for weight and fabrication reasons, while coatings of a material other than alumina (such for example as chromium plate, silicon molded with asbestos, or phenolic and fiberglass) also yield results which are less than satisfactory. Uncoated metals, such as titanium sheet (alloyed with aluminum and tin) disintegrate completely upon burn-through, which occurs in approximately one second under conditions above set forth. The conclusion to be drawn is that erosive blast, thermal shock and temperature conditions in such environments are too severe to be withstood by materials of this nature.

To overcome the deficiencies in known arrangements, the present invention combines the erosion resistance and excellent bonding properties of a metal such as molybdenum with the good thermal shock resistance and insulating properties of a ceramic such as aluminum oxide; these two substances being alternately applied to a base member as a multi-layer coating of a total thickness and with a number of layers governed by the conditions to be encountered by the component in actual use. Exhaustive tests, the results of which will be set forth hereinafter, have shown this laminated form of coating to possess heat- and blast-resistant characteristics far superior to those of the coatings previously utilized. Each metallic layer of the invention material acts both as a cementing agent and as a surface to which further ceramic material can readily adhere, while at the same time providing the erosion resistance so necessary to preclude premature failure of the base member to which the coating is applied. Each intermediate layer of ceramic material acts to insulate the respective metallic coating upon which it is applied from direct contact with the rocket motor blast gases (for example) until the metallic layer covering the same has burned through. The total time required for all of the laminations to be destroyed is thus appreciably greater than in the case of non-laminated surface coverings.

One object of the present invention, therefore, is to provide an improved form of coating designed to protect the member upon which it is applied from heat and/or the corrosive effects of high-velocity gases, and to a process for making the same.

Another object of the invention is to provide a laminated form of protective coating in which layers of metallic material alternate with layers of an insulating substance having high thermal shock resistance.

A further object of the invention is to provide a multilayer protective coating specifically designed to withstand severe erosive blast, thermal shock, and temperature conditions, such coating being made up of alternate layers of a metal such as molybdenum and a ceramic such as aluminum oxide, applied to a base member in accordance with the following symbolic diagram:

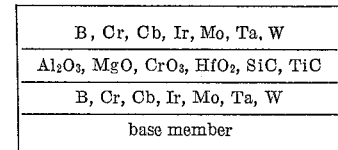

Other objects and many of the attendant advantages of this invention will be readily appreciated as the same becomes better understood by reference to the following detailed description.

The laminated coating of the present invention can be built up without difficulty if the surface to which the coating is to be applied has been properly conditioned by some method such as blasting with a 20- to 40- mesh quartz-type grit. The first step may consist of spraying the base (in this example 17–7 PH steel of .071 in. thickness) with molybdenum from a conventional oxy-acetylene metallizing gun. Oxidation of some of the molybdenum droplets occurs at about 1400° F. yet permits uncontaminated molybdenum to unite strongly with the base metal.

Alumina is then sprayed on the molybdenum to form a strictly mechanical bond. It may be applied from rod form, for example, by feeding a cylindrical extruded alumina rod of ⅛ in. diameter at a rate of 6 in. per minute into the tip of an oxy-acetylene flame. Compresses air at 80 p.s.i. projects the molten particles about 4 in. to the base material where they flatten and freeze. However, if powdered alumina is to be used, the spray gun is provided with a gravity feed from a powder hopper through a metering valve. Powder is drawn at reduced pressure into a siphon chamber, and propelled into the nozzle by a controlled stream of oxy-acetylene. A siphon-jet arrangement at the gun nozzle helps to propel the plastic particles, and a small electrically-operated vibrator may be attached to the gun below the nozzle to assure smooth flow. The steps of the process are then repeated as many times as is necessary to build up the required number of laminations in the end product. If desired, the alumina layer may be applied directly to the base member instead of upon the molybdenum, the process steps then alternating as before to preferably end with a layer of metal. This coating also may be applied by use of an arc plasma gun.

Some representative examples of the invention process are as follows:

Examples 1

Six layers of molybdenum having an average thickness per layer of .002 in. were flame-sprayed alternately with five layers of alumina having an average thickness of .007 in. per layer. The resulting coating was approximately .05 in. thick. When exposed to a rocket engine blast of approximately 5000° F., only a slight erosion of the top layer of molybdenum occurred, with little additional penetration into the secondary layer of alumina. There was no perceptible spalling or poor adhesion.

Example 2

A sheet of molybdenum .04 in. thick was stress-relieved and then electroplated with a chromium-nickel coating. It was attached to a base member of 17–7 PH steel coated with multiple layers of molybdenum and alumina (applied by the process set forth above) having a total thickness of .015 in. When exposed to a rocket engine blast, the molybdenum sheet shattered, but the coated base member did not burn through.

Example 3

A glass-impregnated silicon compound was moulded ⅛ in. thick, and then attached as a liner to the 17–7 PH steel base member which had previously been coated with the multi-layer invention material. On test, the liner completely disintegrated, but the coated base member did not burn through.

To further establish the reliability of the invention material, three additional base members were coated with the molybdenum-aluminum oxide lamination and tested under conditions identical to those present in the examples above given. None of these samples burned through, and their exposed surfaces appeared to be only slightly affected. One was further subjected to second full burn-out blast with only negligible change.

At least a considerable portion of the invention material's effectiveness is due to the insulating effect of the ceramic layers. It has been determined that the temperature of a base member protected by the laminated coating of the present invention levels off at a figure as low as approximately 520° F. after 30 seconds exposure, while an unprotected base member burns through in approximately one second under a full rocket blast. A major factor contributing to this excellent insulation of the coating is its inherent porosity. Entrapped air effectively aids both the insulating and thermal shock resistant qualities of the multi-layer coating. Furthermore, gas in the voids, as a result of volume increase upon heating, does not prove detrimental to the bond strength of the coating. These voids are small and for the most part in contact with the atmosphere. Proper control and distribution of this porosity can raise the insulating value of the coating.

While the invention material has been described in a preferred example as consisting of alternate layers of molybdenum and aluminum oxide (which in a particularly suitable form is commercially marketed by the Norton Company under the trade name "Rokide A") other metals and ceramics can be substituted therefor according to the qualities desired in the end product. A few of the substances which have been employed sucessfully for flame spraying are listed in the following table:

| Metals: | Melting point, ° F. |
|---|---|
| Beryllium | 2,340 |
| Boron | 4,200 |
| Chromium | 3,430 |
| Cobalt | 2,723 |
| Columbium | 4,380 |
| Iridium | 4,262 |
| Molybdenum | 4,760 |
| Nickel | 2,651 |
| Platinum | 3,224 |
| Rhodium | 3,610 |
| Tantalum | 5,425 |
| Tungsten | 6,170 |
| Vanadium | 3,100 |
| Zirconium | 3,452 |
| Titanium | 3,400 |
| Ceramics: | |
| $Al_2O_3$ | 3,720 |
| BeO | 4,660 |
| $Cr_3C_2$ | 3,740 |
| $Cr_2O_3$ | 4,125 |
| MgO | 5,070 |
| $(3Al_2O_3 \cdot 2SiO_2)$ | 3,326 |
| SiC | 4,082 |
| TiC | 5,880 |
| $W_2C$ | 4,890 |
| $ZrSiO_4$ | 4,532 |
| $HfO_2$ | 5,090 |

Coatings laid down according to the present invention have good compression strength. Where ductile metals (such as 300 series stainless steel) make up the alternate layers, considerable distortion is possible before the coating fails. Generally speaking the harder the metal the more likely it is to crack. Since the coating is capable of being ground and polished to a fine finish, it provides an excellent base for lubricants. At the same time it can function as a self-lubricating bearing or shaft because of its porosity.

It should be noted that when a base member was coated with a laminated material in which zirconia was substituted for aluminum oxide, the performance was unsatisfactory regardless of the particular laminating metal used. In most instances a complete burn-out occurred. Contrary to expectations, however, a fiberglass base member .04 in. thick covered with a molybdenum-alumina coating having a total thickness of 0.5 in. survived the same test without burn-through. This would indicate that the invention product has utility in high-speed flight vehicles to protect the leading edges of airfoils which are fabricated from organic materials.

Specialized applications of the invention coating are numerous, but each such application encounters environmental conditions for which the coating must be specifically tailored. For example, when severe vibration is present, the number of laminations is increased, and the thickness of each layer reduced. A metal-ceramic multi-layer coating of this type designed for prolonged operation at 3,000° F. withstood extreme erosive and corrosive hot gases for over 18 minutes while being subjected to vibrations of high magnitude. The shock-resistant properties of the invention product thus appear to be of a high order.

Although high-melting-point metals have been indicated as preferred for the multi-layer coating of the invention, it may in some cases be desirable to substitute therefor relatively low-melting-point substances such, for example, as aluminum and copper. The reason why such a substitution may in particular instances be indicated is that the favorable high heat conductivity of these metals may at least partially off-set the disadvantage inherent in their low melting point.

Obviously many modifications and variations of the present invention are possible in the light of the above teachings. It is therefore to be understood that within the scope of the appended claims the invention may be practiced otherwise than as specifically described.

I claim:

1. A laminated coating for a member to be protected, said coating being designed to resist the effects of heat and/or high-velocity gases and made up of at least three layers in which metallic material is alternated with a porous ceramic substance, at least one of said layers being made of said ceramic substance, said metallic material being selected from a group consisting of boron, chromium, columbium, iridium, molybdenum, tantalum and tungsten, said ceramic substance being selected from a group consisting of aluminum oxide, magnesium oxide, chromium oxide, hafnium oxide, silicon carbide and titanium carbide.

2. A laminated coating for a member to be protected, said coating being designed to resist the effects of temperatures in excess of 4,000° F. and being made up of a plurality of layers of molybdenum each of approximately .0025 in. thickness alternating with layers of alumina each of approximately .005 in. thickness, the aggregate numbers of layers being at least three.

References Cited in the file of this patent

UNITED STATES PATENTS

| | | |
|---|---|---|
| 2,683,305 | Goetzel | July 13, 1954 |
| 2,696,662 | Le Sech | Dec. 14, 1954 |
| 2,697,670 | Gaudenzi et al. | Dec. 21, 1954 |
| 2,763,919 | Kempe et al. | Sept. 25, 1956 |
| 2,775,531 | Montgomery et al. | Dec. 25, 1956 |
| 2,823,139 | Schulze et al. | Feb. 11, 1958 |
| 2,839,292 | Bellamy | June 17, 1958 |
| 2,903,375 | Peras | Sept. 8, 1959 |
| 2,924,537 | Wallis et al. | Feb. 9, 1960 |